(12) United States Patent
Sako et al.

(10) Patent No.: US 9,386,212 B2
(45) Date of Patent: Jul. 5, 2016

(54) INFORMATION PROCESSING DEVICE, SYSTEM AND STORAGE MEDIUM TO PROVIDE SHOOTING PARAMETERS

(71) Applicant: SONY CORPORATION, Tokyo (JP)

(72) Inventors: Yoichiro Sako, Tokyo (JP); Yuan Wei, Tokyo (JP)

(73) Assignee: Sony Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/394,855

(22) PCT Filed: Mar. 22, 2013

(86) PCT No.: PCT/JP2013/058213
§ 371 (c)(1),
(2) Date: Oct. 16, 2014

(87) PCT Pub. No.: WO2013/179742
PCT Pub. Date: Dec. 5, 2013

(65) Prior Publication Data
US 2015/0077576 A1  Mar. 19, 2015

(30) Foreign Application Priority Data

May 30, 2012 (JP) .................................. 2012-122919

(51) Int. Cl.
| | |
|---|---|
| *H04N 5/232* | (2006.01) |
| *H04N 1/00* | (2006.01) |
| *H04N 5/765* | (2006.01) |
| *H04N 5/77* | (2006.01) |
| *H04N 9/82* | (2006.01) |
| *H04N 101/00* | (2006.01) |

(52) U.S. Cl.
CPC ....... *H04N 5/23206* (2013.01); *H04N 1/00183* (2013.01); *H04N 1/00244* (2013.01); *H04N 5/23222* (2013.01); *H04N 5/23245* (2013.01); *H04N 5/765* (2013.01); *H04N 5/772* (2013.01); *H04N 9/8205* (2013.01); *H04N 2101/00* (2013.01); *H04N 2201/0084* (2013.01)

(58) Field of Classification Search
CPC .......... H04N 5/23206; H04N 1/00183; H04N 1/00244; H04N 5/23222; H04N 5/765; H04N 9/8205; H04N 2201/8205
USPC ............... 348/207.1, 207.11, 211.1; 382/158, 382/209, 165, 305
See application file for complete search history.

(56) References Cited

U.S. PATENT DOCUMENTS

| | | | |
|---|---|---|---|
| 2007/0183767 A1* | 8/2007 | Kasai et al. ...................... 396/56 |
| 2009/0202147 A1* | 8/2009 | Sambongi ........... G06F 17/3025 382/165 |
| 2011/0234817 A1* | 9/2011 | Sakamoto .................. 348/207.1 |

FOREIGN PATENT DOCUMENTS

| | | |
|---|---|---|
| JP | 2003-333498 A | 11/2003 |
| JP | 2005-184610 A | 7/2005 |

(Continued)

*Primary Examiner* — Nhan T Tran
(74) *Attorney, Agent, or Firm* — Chip Law Group (57) ABSTRACT

There is provided an information processing device including an acquisition unit configured to acquire an image from a client terminal, a storage unit configured to store images to each of which a shooting parameter and objective evaluation are assigned, an identification unit configured to identify images each of which has an imaging environment similar to an imaging environment of the image acquired by the acquisition unit, among the images stored in the storage unit, and a transmission unit configured to transmit, to the client terminal, a shooting parameter of an image selected on the basis of the objective evaluation from the images identified by the identification unit.

11 Claims, 8 Drawing Sheets

(56) References Cited

FOREIGN PATENT DOCUMENTS

| JP | 2007-027945 A | 2/2007 |
| JP | 2008-288881 A | 11/2008 |
| JP | 2009-077157 A | 4/2009 |
| JP | 2009-239397 A | 10/2009 |
| JP | 2011-010273 A | 1/2011 |
| JP | 4609338 B2 | 1/2011 |
| JP | 2011-103548 A | 5/2011 |
| JP | 2011-188318 A | 9/2011 |

* cited by examiner

INFORMATION PROCESSING DEVICE, SYSTEM AND STORAGE MEDIUM TO PROVIDE SHOOTING PARAMETERS

TECHNICAL FIELD

The present disclosure relates to an information processing device, a system, and a storage medium.

BACKGROUND ART

Recently, digital cameras and digital video cameras that store and save a subject image as a digital image signal in a storage medium have been spread. In a case where images are shot using such camera, it is necessary to set shooting parameters of the camera appropriately according to a surrounding environment and situation.

However, it is difficult for general users to manually set appropriate shooting parameters. Accordingly, in general, digital cameras and the like have an auto function by which shooting parameters corresponding to environments are automatically set. For example, the following Patent Literatures 1 and 2 propose imaging devices that automatically set appropriate shooting parameters corresponding to subjects.

In addition, the following Patent Literature 3 proposes a technology of presenting shooting parameters corresponding to a specified subject, and the following Patent Literatures 4 and 5 propose technologies of easily setting shooting conditions corresponding to a preference of a user. In addition, the following Patent Literature 6 proposes a shooting-information providing device which continuously transmits shooting parameters appropriate for a certain place at a certain time slot.

Furthermore, the following Patent Literature 7 proposes an image-shooting system of presenting, to users, an imaging position for shooting same images as sample images in guidebooks or posters at tourist attractions.

CITATION LIST

Patent Literature
  Patent Literature 1: JP 2005-184610A
  Patent Literature 2: JP 2011-103548A
  Patent Literature 3: JP 2011-10273A
  Patent Literature 4: JP 2011-188318A
  Patent Literature 5: JP 2003-333498A
  Patent Literature 6: JP 4609338B
  Patent Literature 7: JP 2008-288881A

SUMMARY OF INVENTION

Technical Problem

However, according to Patent Literatures 1 and 2, since shooting parameters are set in a predetermined range, it is possible to handle simple composition, but it is difficult to set most appropriate shooting parameters for backlight composition, complicated composition, or the like.

Although Patent Literature 3 refers to acquiring the most appropriate shooting parameters for some subjects, Patent Literature 3 does not particularly refer to acquiring most appropriate shooting parameters in consideration of balance of a whole image to be shot.

In addition, shooting parameters and shooting conditions acquired in Patent Literatures 4 to 7 are uniformly decided in advance (or the parameters and the conditions are selected from the uniformly decided parameters and conditions). Accordingly, it is impossible to acquire most appropriate shooting parameters according to evaluations by others.

The present disclosure proposes a novel and improved information processing device, system, and recording medium capable of providing shooting parameters that are more suitable for a situation on the basis of objective evaluation.

Solution to Problem

According to the present invention, there is provided an information processing device including an acquisition unit configured to acquire an image from a client terminal, a storage unit configured to store images to each of which a shooting parameter and objective evaluation are assigned, an identification unit configured to identify images each of which has an imaging environment similar to an imaging environment of the image acquired by the acquisition unit, among the images stored in the storage unit, and a transmission unit configured to transmit, to the client terminal, a shooting parameter of an image selected on the basis of the objective evaluation from the images identified by the identification unit.

According to the present invention, there is provided a system including an information processing device which includes an acquisition unit configured to acquire an image from a client terminal, a storage unit configured to store images to each of which a shooting parameter and objective evaluation are assigned, an identification unit configured to identify images each of which has an imaging environment similar to an imaging environment of the image acquired by the acquisition unit, among the images stored in the storage unit, and a transmission unit configured to transmit, to the client terminal, a shooting parameter of an image selected on the basis of the objective evaluation from the images identified by the identification unit, and the client terminal which includes an imaging unit configured to image a subject, a transmission unit configured to transmit, to the information processing device, an image captured by the imaging unit and a shooting parameter at a time of capturing the image, and a reception unit configured to receive the shooting parameter of the image selected by the information processing device.

According to the present invention, there is provided a non-transitory computer-readable storage medium having a program stored therein, the program causing a computer to execute processing of acquiring an image from a client terminal, processing of identifying images each of which has an imaging environment similar to an imaging environment of the image acquired by the acquisition processing, among images which are stored in a storage unit and to each of which a shooting parameter and objective evaluation are assigned, and processing of transmitting, to the client terminal, a shooting parameter of an image selected on the basis of the objective evaluation from the images identified by the identification processing.

Advantageous Effects of Invention

As explained above, the present disclosure can provide shooting parameters that are more suitable for a situation on the basis of objective evaluation.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Overview of Shooting-Parameter Selection System according to Embodiment of Present Disclosure
2. Basic Configuration
2-1. Configuration of Digital Camera
2-2. Configuration of Server
3. Operation Processing
4. Conclusion <1. Overview of Shooting-Parameter Selection System According to Embodiment of Present Disclosure>

Figure 1:
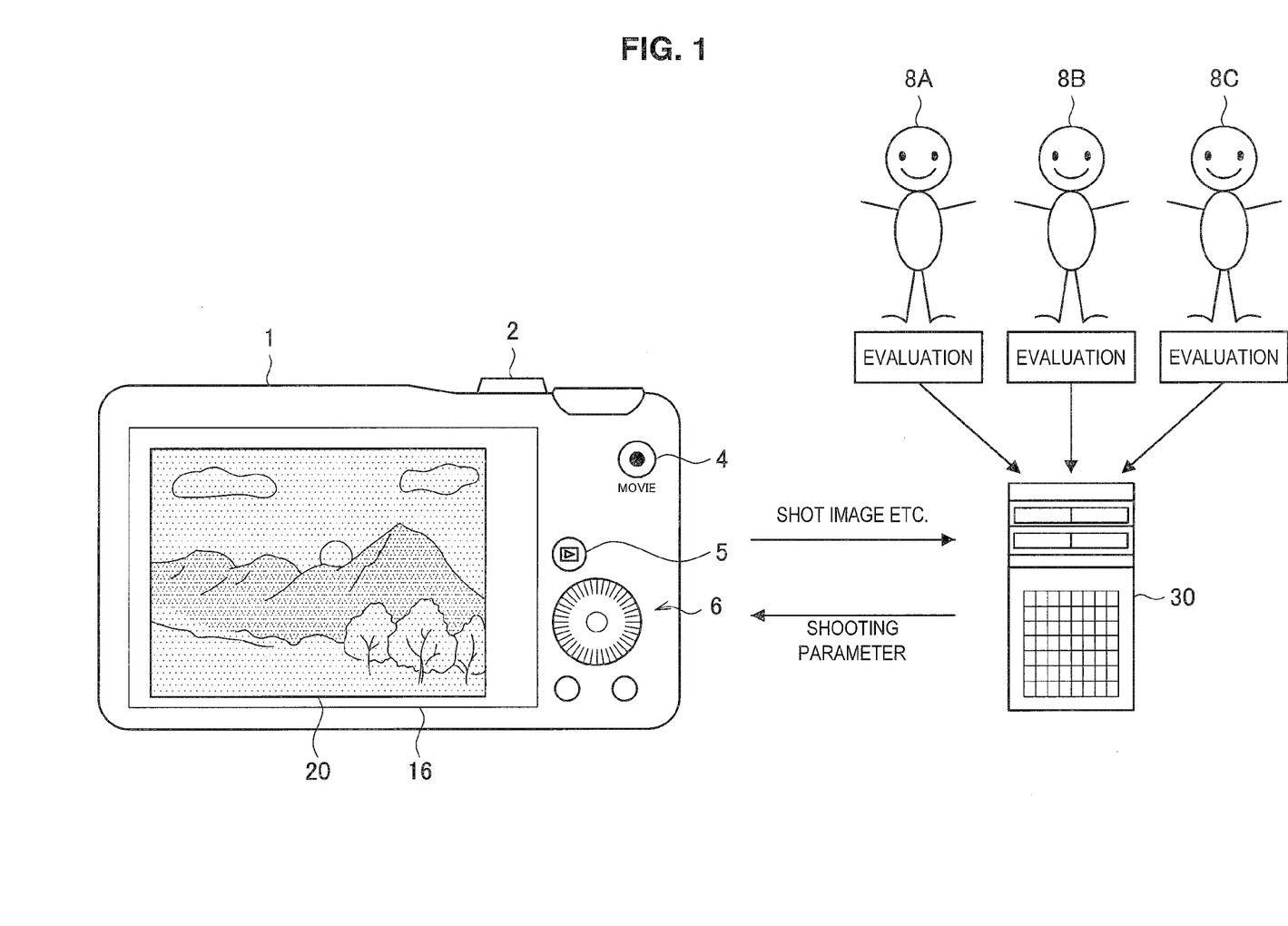
FIG. 1 is a diagram illustrating an overview of a shooting-parameter selection system according to an embodiment of the present disclosure.

First, with reference to FIG. 1, an overview of a shooting-parameter selection system according to an embodiment of the present disclosure is explained.

FIG. 1 is a diagram illustrating an overview of a shooting-parameter selection system according to an embodiment of the present disclosure. As shown in FIG. 1, the shooting-parameter selection system according to the present embodiment includes a digital camera 1 and a server 30. For example, the digital camera 1 can connect to a network in a wireless or wired manner, and further connect to the server 30 on the network.

In addition, as shown in FIG. 1, the digital camera 1 according to the present embodiment is provided with a shutter button 2, a MOVIE (moving image) button 4, a playback button 5, a dial 6, and a display unit 16. Furthermore, in a surface facing a surface where the display unit 16 shown in FIG. 1 is provided, a flash and an imaging lens are provided (not shown).

The digital camera 1 shown in FIG. 1 is capable of switching an operation mode to a still-image shooting mode, a moving-image shooting mode, or a playback mode, for example. In a case of the still-image shooting mode, the digital camera 1 stores, in memory, still-image data (photograph) imaged through the imaging lens in response to a timing when the shutter button 2 is pressed.

On the other hand, In a case of the moving-image shooting mode, the digital camera 1 starts to shoot a moving image in response to a timing when the MOVIE button 4 is pressed, and stores moving-image data (video) imaged through the imaging lens in the memory.

When the playback button 5 is pressed, the digital camera 1 switches the operation mode to the playback mode, and displays, on the display unit 16, pieces of image data including the still-image data and moving-image data stored in the memory.

In a case of the shooting modes (still image/moving image), a user may manually set respective shooting parameters by operating the dial 6 and the like, or may set the respective shooting parameters by using an auto function. Normally, general users set the respective shooting parameters by using the auto function. Subsequently, as shown in FIG. 1, a shot image (shot image 20) is displayed on the display unit 16, and the user can immediately check the shot image.

By using the normal auto function, shooting parameters are set within a certain fail-proof range according to surrounding brightness and a subject to be focused on. Accordingly, a shot image can be acquired without failure such as a blur. However, such shot image does not have a feature and a character, and such image often has little impact. In addition, although the normal auto function can handle simple composition, the normal auto function cannot handle backlight composition such as a sunset or a sunrise, or complicated composition. It is difficult to set most appropriate shooting parameters.

Alternatively, as shown in FIG. 1, the digital camera 1 according to an embodiment of the present disclosure can transmit information (shooting position information, shooting date information, and the like) on the shot image 20 and/or a shooting environment to the server 30, and can acquire most appropriate shooting parameters from the server 30.

On the other hand, the server 30 includes images to each of which objective evaluation is assigned, the objective evaluation being collected beforehand from one or more users 8A to 8C. Subsequently, the server 30 returns, to the digital camera 1, shooting parameters of an image which has been shot in an environment similar to the received shot image 20 and which has high objective evaluation.

In this way, a shooting-parameter changing system according to the present embodiment can provide shooting parameters that are more suitable for a situation on the basis of objective evaluation.

Note that, in the present specification, the shooting parameters include ON/OFF of a flash, shutter speed, ISO speed, a diaphragm (F value), exposure value (EV) shift, an exposure mode, white balance, color emphasis, chroma, contrast, a sharpness, and the like.

Hereinafter, such shooting-parameter selection system according to the present embodiment is explained in detail. Note that, the present embodiment shows the server 30 as an example of an information processing device that achieves the shooting-parameter selection system. In addition, the present embodiment also shows the digital camera 1 as an example of a client terminal that achieves the shooting-parameter selection system. However, the example of the client terminal according to the present disclosure is not limited thereto. For example, the client terminal according to the present embodiment may be a digital video camera, a camera-equipped smartphone, a personal digital assistant (PDA), a personal computer (PC), a cellular phone, a portable music playback apparatus, a portable video processing apparatus, a portable game device, or the like.

<2. Basic Configuration>

Next, configurations of the digital camera 1 and the server 30 included in the shooting-parameter changing system according to an embodiment of the present disclosure are explained.

[2-1. Configuration of Digital Camera]

Figure 2:
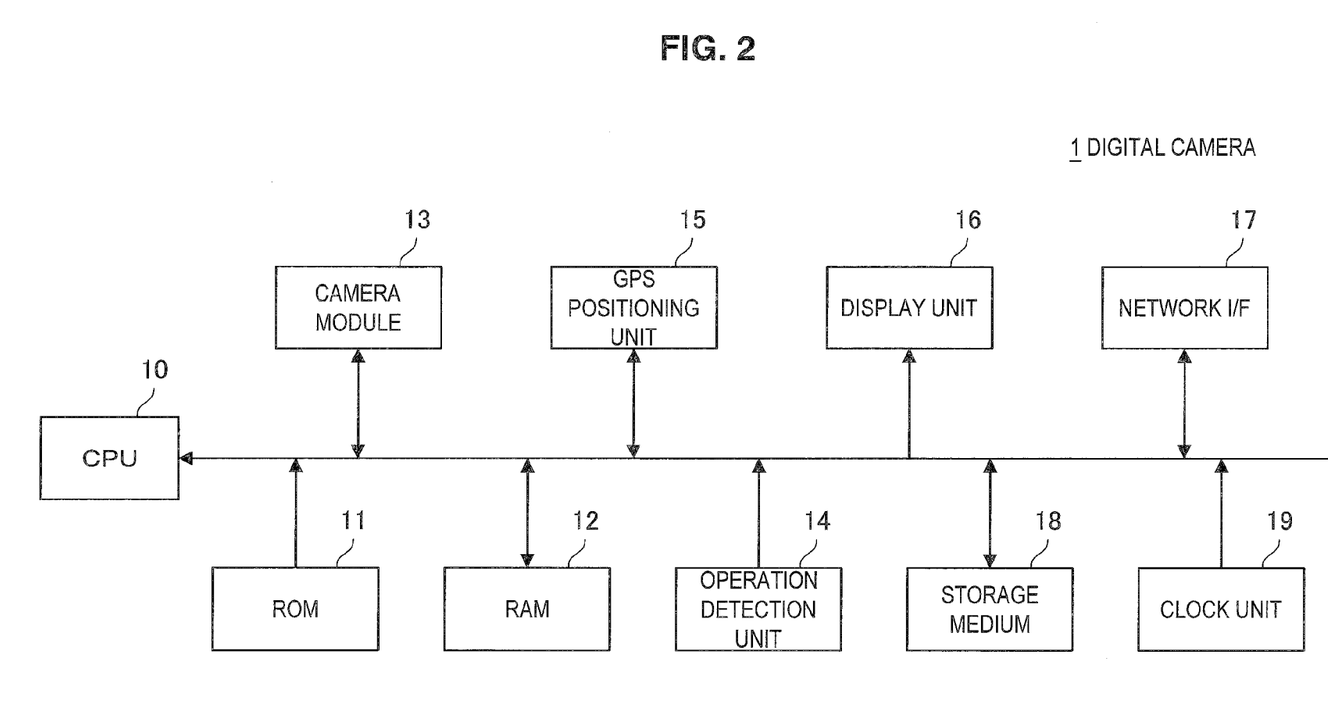
FIG. 2 is a block diagram showing a configuration of a digital camera according to the present embodiment.

FIG. 2 is a block diagram showing a configuration of the digital camera 1 according to the present embodiment. As shown in FIG. 2, the digital camera 1 includes a CPU 10, ROM 11, RAM 12, a camera module 13, an operation detection unit 14, a GPS positioning unit 15, a display unit 16, a network I/F 17, a storage medium 18, and a clock unit 19. In the following, respective configurations are explained in detail.

The camera module 13 includes an imaging optical system having an image sensor and an imaging lens, and a shot-image-signal processing unit, and outputs data of the shot image as a digital signal. Note that, the image sensor is achieved by a charge coupled device (CCD) imager or a complementary metal oxide semiconductor (CMOS) imager, for example.

The shooting parameters (ON/OFF of a flash, shutter speed, ISO speed, a diaphragm (F value), EV shift, an exposure mode, white balance, color emphasis, chroma, contrast, a sharpness, and the like) of the camera module 13 may be set manually or automatically. In the shooting-parameter selection system according to the present embodiment, the shooting parameters of the camera module 13 may be set to shooting parameters received from the server 30.

The operation detection unit 14 is a detection unit to detect camera operation performed by a user. For example, as shown in FIG. 1, the camera operation performed by the user is detected from the shutter button 2, the MOVIE button 4, the dial 6, and the playback button 5 which are physically provided on the digital camera 1. On the other hand, the operation detection unit 14 may detect operation from a touchscreen that detects a touch position of the user on a screen displayed on the display unit 16.

The Global Positioning System (GPS) positioning unit 15 receives a radio wave from a GPS satellite, detects a position where the digital camera 1 exists, and outputs information on the detected position. Note that, the GPS positioning unit 15 is an example of a position-information acquisition unit which detects a position of the digital camera 1 on the basis of a signal acquired from an outside. Accordingly, the example of the position-information acquisition unit according to the present embodiment is not limited thereto. For example, the position-information acquisition unit may detects a position by transmitting/receiving to/from a Wi-Fi device, a cellular phone, a PHS, a smartphone, or through near field communication.

The display unit 16 displays not only a menu screen and diverse operation screens, but also a shot image output from the camera module 13 in real time, and displays (playbacks) image data (still-image data/moving-image data) stored in the storage medium 18. In addition, the display unit 16 is achieved by a liquid crystal display (LCD), or an organic light-emitting diode (OLED), for example.

The network I/F 17 is a communication interface for performing data communication with an external device.

The storage medium 18 is an image storage unit to store shot images, and is achieved by a recording medium such as flash memory like card type memory or a digital versatile disc (DVD). In response to operation timings of the shutter button 2, the storage medium 18 may store, as still-image data (photograph), shot images continuously output from the camera module 13. Alternatively, in response to operation timings of the MOVIE button 4, the storage medium 18 may store, as moving-image data (video), shot images continuously output from the camera module 13.

When storing the still-image data/moving-image data, the storage medium 18 may store, as shooting date information, date information output from the clock unit 19 by assigning the date information to the still-image data/moving-image data. In addition, when storing the still-image data/moving-image data, the storage medium 18 may store, as shooting-position information, position information output from the GPS positioning unit 15 by assigning the position information to the still-image data/moving-image data.

The clock unit 19 outputs the date information indicating current time and date.

The CPU 10 is a main control unit to control configurations of the digital camera 1. For example, the CPU 10 (main control unit) according to the present embodiment may perform control in a manner that a shot image output from the camera module 13 is transmitted to the server 30 through the network I/F 17, and most appropriate shooting parameters are requested. Subsequently, the CPU 10 may perform control in a manner that shooting parameters of the camera module 13 is set on the basis of the shooting parameters received from the server 30.

Note that, it is also possible for the CPU 10 to additionally transmit environment information when transmitting the shot image to the server 30, the environment information relating to an environment at a time of shooting an image such as shooting-date information and shooting-position information which are assigned to the shot image.

The ROM 11 stores a program by which the CPU 10 performs processing of setting shooting parameters, and the like. In addition, the CPU 10 uses the RAM 12 as a work area, and the program stored in the ROM 11 is performed.

The configuration of the digital camera 1 according to the present embodiment has been explained in detail so far. Next, with reference to FIG. 3, a configuration of the server 30 according to the present embodiment is explained.

[2-2. Configuration of Server]

Figure 3:
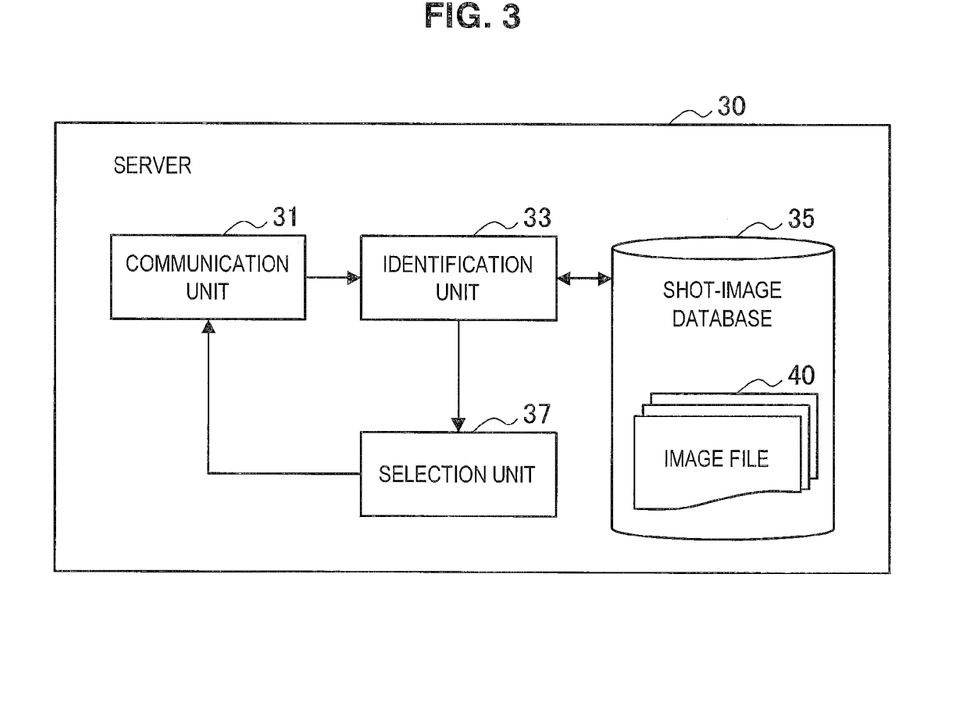
FIG. 3 is a diagram showing a configuration of a server according to the present embodiment.

FIG. 3 is a diagram showing a configuration of the server 30 according to the present embodiment. As shown in FIG. 3, the server 30 according to the present embodiment includes a communication unit 31, an identification unit 33, a shot-image database 35 (referred to as shot-image DB 35 hereinafter), and a selection unit 37.

(Communication Unit 31)

The communication unit 31 is an interface for transmitting/receiving data to/from an external device. More specifically, the communication unit 31 according to the present embodiment receives (acquires) a shot image from the digital camera 1, and receives a transmission request of shooting parameters. Note that, the communication unit 31 may receive shooting-date information and shooting-position information together with the shot image. In addition, the communication unit 31 according to the present embodiment transmits shooting parameters of an image selected by the later-described selection unit 37, to the digital camera 1 which is a transmission-request source of the shooting parameters.

(Shot-Image DB 35)

The shot-image DB 35 is a storage unit to store images (shot images) to each of which shooting parameters and objective evaluation are assigned. For example, the shot-image DB 35 stores, as an image file 40, image data to which shooting parameters and objective evaluation are assigned. In the following, with reference to FIG. 4, a data configuration of an image file 40 stored in the shot-image DB 35 is explained.

Figure 4:
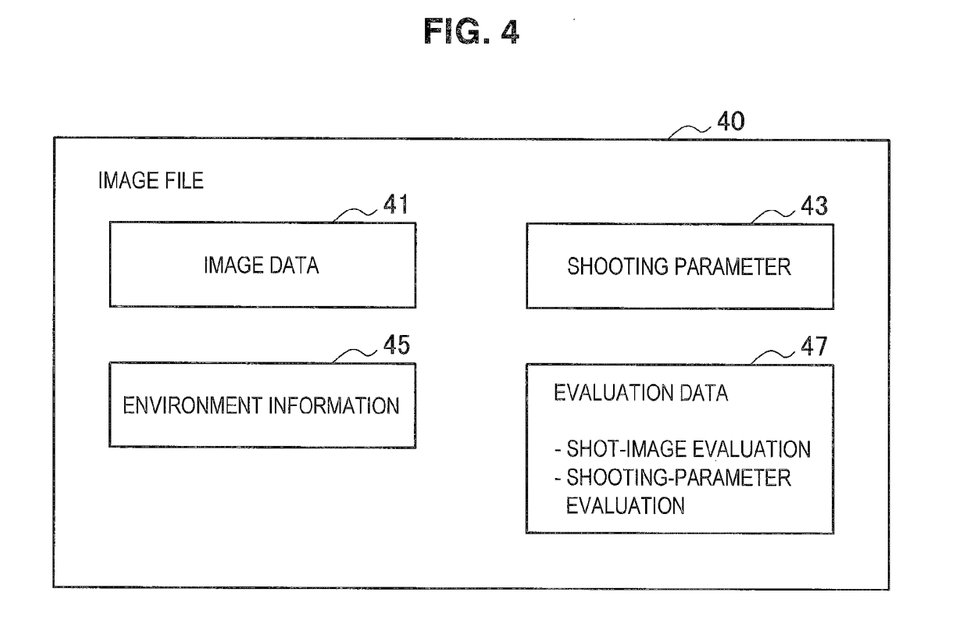
FIG. 4 is a diagram showing a data configuration of an image file stored in a shot-image DB according to the present embodiment.

FIG. 4 is a diagram showing a data configuration of an image file 40 stored in the shot-image DB 35. As shown in FIG. 4, the image file 40 according to the present embodiment includes image data 41, shooting parameters 43, environment information 45, and evaluation data 47.

The image data 41 is data of a shot image itself such as a photograph or a moving image. The shooting parameters 43 are information of shooting parameters at a time of acquiring a shot image.

The environment information 45 is information on a shooting environment at a time of acquiring a shot image. Specifically, the environment information 45 is shooting-date information, shooting-position information, weather information, season information, illuminance information, manufacturer information and model information on an imaging device (such as digital camera), manufacturer information on an imaging lens, and the like.

Note that, the shooting-position information may be estimated not only from information on a position positioned by the GPS positioning unit 15, but also from title information assigned to a shot image. Note that, the shooting-date information may be estimated not only from date information output from the clock unit 19 but also from title information assigned to a shot image.

The environmental information 45 may include composition information and focus target information (information indicating which subject is of interest) on a shot image. Note that, the composition information and the focus information may be estimated from an image analysis result and shooting parameters.

The evaluation data 47 is objective evaluation of a shot image by a person other than a photographer. As shown in FIG. 4, the evaluation data 47 (objective evaluation) includes "shot-image evaluation" indicating objective evaluation of image data 41 (shot image) and "shooting-parameter evaluation" indicating objective evaluation of the shooting parameters 43 of the shot image.

Specifically, the shot-image evaluation is evaluation by a user (user other than the photographer) who views the image data 41. In addition, the shot-image evaluation may be calculated on the basis of data such as evaluation by the user, record of awards, a popularity rating (traffic and rankings), and the like of the shot image.

The shooting-parameter evaluation is evaluation by a user who set shooting parameters based on the shooting parameters 43 and actually shot an image. For example, even in a case of a dynamic shot image acquiring high evaluation, it is assumed that an image sometimes becomes a flat photograph when actually shooting the image by using shooting parameters of the dynamic shot image. Accordingly, evaluation of a shot image and evaluation of shooting parameters are separately calculated.

Note that, the evaluation data 47 may be calculated after converting evaluation by each user to points.

(Identification Unit 33)

Identification unit 33 identifies, from images stored in the shot-image DB 35, an image having a shooting environment similar to a shooting environment of a shot image received from the digital camera 1. Here, the shooting environment means a subject which is a shooting target, illuminance and weather at a time of shooting an image.

The identification unit 33 may identify an image having a similar shooting environment by image matching, for example.

Alternatively, in a case where environment information such as shooting-position information and shooting-date information is received together with a shot image from the digital camera, the identification unit 33 may identifies an image having a similar shooting environment on the basis of such environment information.

Specifically, on the basis of environment information of the shot image received from the digital camera 1 and environment information 45 of images stored in the shot-image DB 35, the identification unit 33 identifies a shot image of a same subject as the received shot image, the shot image being shot at a shooting place and shooting time that are near to a shooting place and shooting time of the received shot image.

Figure 5:
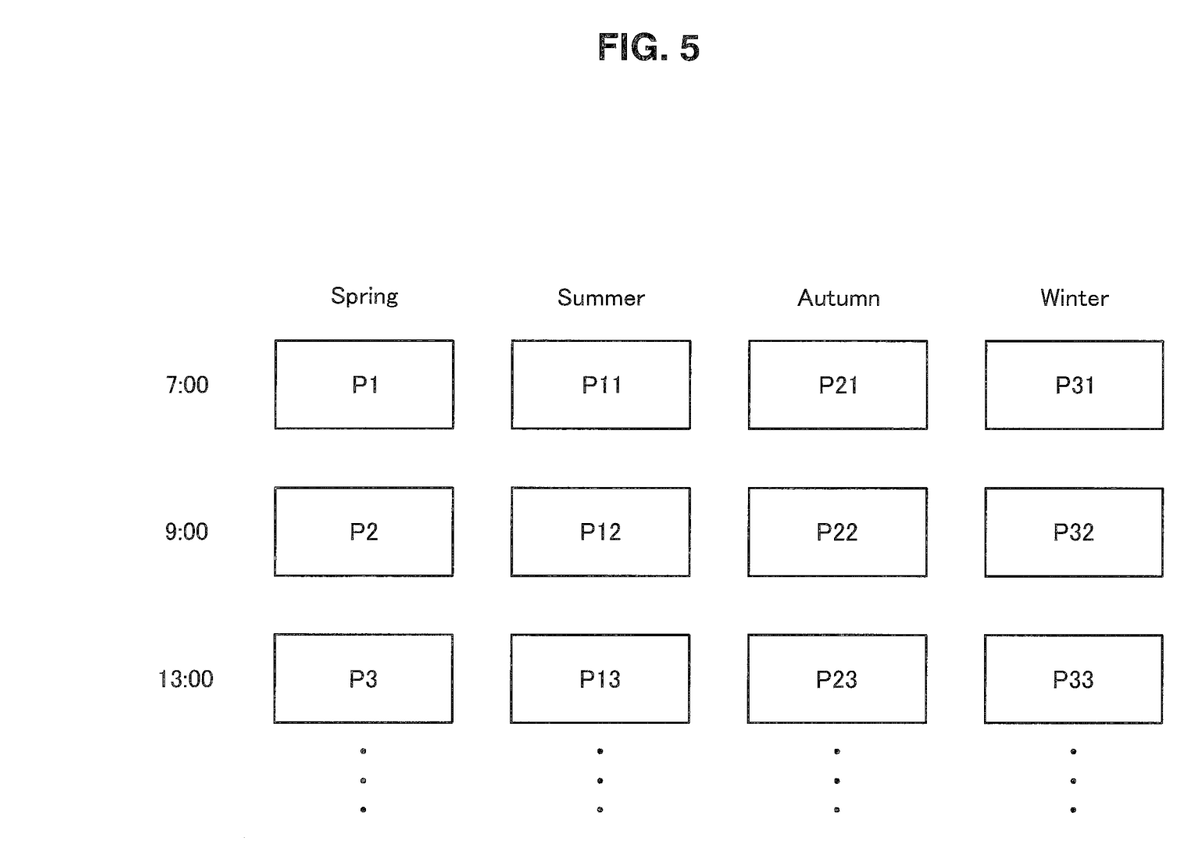
FIG. 5 is a diagram illustrating that an identification unit according to the present embodiment identifies an image having a similar imaging environment on the basis of a season and shooting time.

Furthermore, the identification unit 33 may identify an image having a similar shooting environment in consideration of weather information, season information, illuminance information, or the like. For example, as shown in FIG. 5, the identification unit 33 classifies, on the basis of environment information 45, shot images (image data) P1 to P33 stored in the shot-image DB 35 in seasons, and then identifies an image having a shooting environment (season and time) similar to the received shot image.

Note that, the identification unit 33 may identifies an image having a similar environment not only from images stored in the shot-image DB 35, but also from images which are stored in unspecified number of storage devices on a network and to each of which shooting parameters and objective evaluation are assigned.

(Selection Unit 37)

The selection unit 37 selects an image on the basis of objective evaluation from among images identified by the identification unit 33. More specifically, for example, the selection unit 37 selects an image having highest objective evaluation (shot-image evaluation or shooting-parameter evaluation) from among a plurality of identified images, the objective evaluation being assigned to each of the images. Subsequently, the selection unit 37 transmits shooting parameters 43 of the selected image to the digital camera 1 which is a request source, through the communication unit 31.

In this way, the server 30 can return most-appropriate shooting parameters that are more suitable for a situation to the digital camera 1, not on the basis of shooting parameters that has been temporarily decided beforehand, shooting parameters that are most appropriate for some subjects, or the like, but on the basis of objective evaluation.

Note that, a user may decide which of shot-image evaluation and shooting-parameter evaluation is used as objective evaluation which is a standard at a time when the selection unit 37 selects an image. Such decision processing of the selection standard is explained in detail in "3-2. Processing of Deciding Shooting-Parameter Selection Standard".

In addition, the server 30 according to the present embodiment may determine whether an imaging device assigned to the image selected by the selection unit 37 is different from a model of the digital camera 1 which is the request source, on the basis of model information and the like on the imaging device which is assigned to the selected image. In a case where the models are different, the server 30 may correct shooting parameters of the selected image so as to correspond to the model of the digital camera 1, and then transmits the corrected shooting parameters to the digital camera 1.

The configurations of the digital camera 1 and the server 30 which achieves the shooting-parameter selection system according to the present embodiments has been explained in detail. Next, operation processing of the shooting-parameter selection system according to the present embodiments is explained in detail.

<3. Operation Processing>
[3-1. Operation Processing of Shooting-Parameter Selection System]

As described above, in the shooting-parameter selection system according to the present embodiment, the digital camera 1 requests the server 30 to transmit shooting parameters, and the server 30 returns shooting parameters selected on the basis of objective evaluation to the digital camera 1. Subsequently, the digital camera 1 sets shooting parameters on the basis of the shooting parameters received from the server 30. In the following, with reference to FIG. 6, the operation processing of the shooting-parameter selection system according to the present embodiments is explained in detail.

Figure 6:
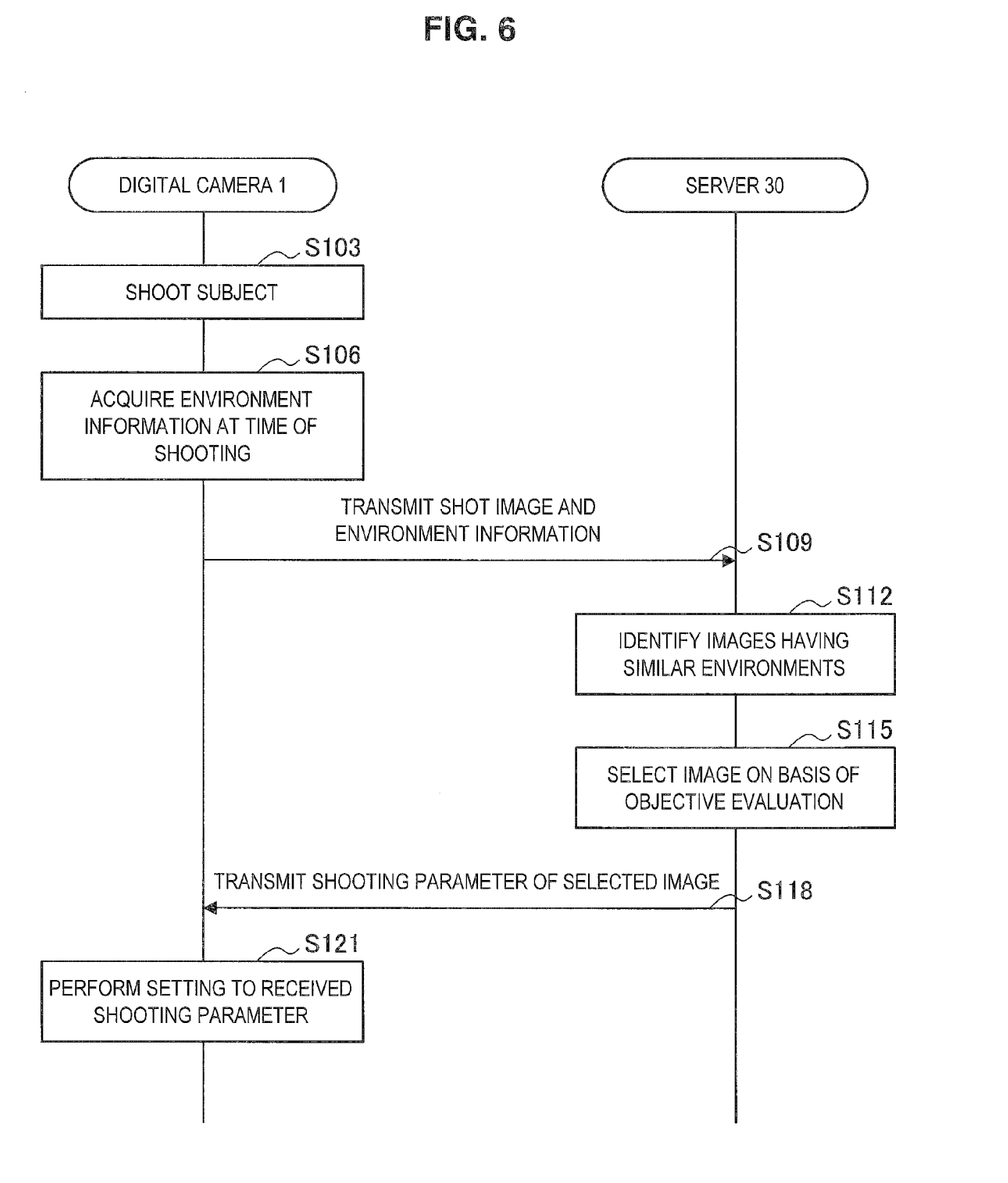
FIG. 6 is a flowchart showing operation processing of a shooting-parameter selection system according to the present embodiment.

FIG. 6 is the flowchart showing operation processing of the shooting-parameter selection system according to the present embodiment. As shown in FIG. 6, the digital camera 1 first shoots a subject in Step S103, and then acquires environment information at a time of shooting in Step S106. The environment information at the time of shooting may be position information output from the GPS positioning unit 15 and date information output from the clock unit 19, for example.

Next, in Step S109, the digital camera 1 transmits a shot image and the environment information to the server 30, and requests the server 30 to transmit shooting parameters.

Subsequently, in Step S112, the identification unit 33 of the server 30 identifies images having shooting environments similar to a shooting environment of the shot image acquired from the digital camera 1.

Next, in Step S115, the selection unit 37 of the server 30 selects, for example, an image having highest points in the objective evaluation on the basis of objective evaluation from among the identified images.

Subsequently, in Step S118, the communication unit 31 of the server 30 transmits shooting parameters of the selected image to the digital camera 1.

Next, in Step S121, the digital camera 1 sets shooting parameters of the camera module 13 on the basis of the received shooting parameters.

In this way, the digital camera 1 according to the present embodiment can acquire and set most-appropriate shooting parameters that are according to the objective evaluation and that are more suitable for the situation.

Note that, the digital camera 1 may notify a user that the most-appropriate shooting parameters having the high objective evaluation has been set. The user can shoot the subject with the set shooting parameters by checking the notification and pressing the shutter button 2.

[3-2. Processing of Deciding Shooting-Parameter Selection Standard]

As described above, when the selection unit 37 of the server 30 selects an image in Step S115 shown in FIG. 6, the objective evaluation as a standard includes the shot-image evaluation and shooting-parameter evaluation. It may be decided according to, for example, a request from a user side as to which objective evaluation is used when the selection unit 37 selects an image. In the following, with reference to FIG. 7, the processing of deciding the shooting-parameter selection standard according to the present embodiments is explained in detail.

Figure 7:
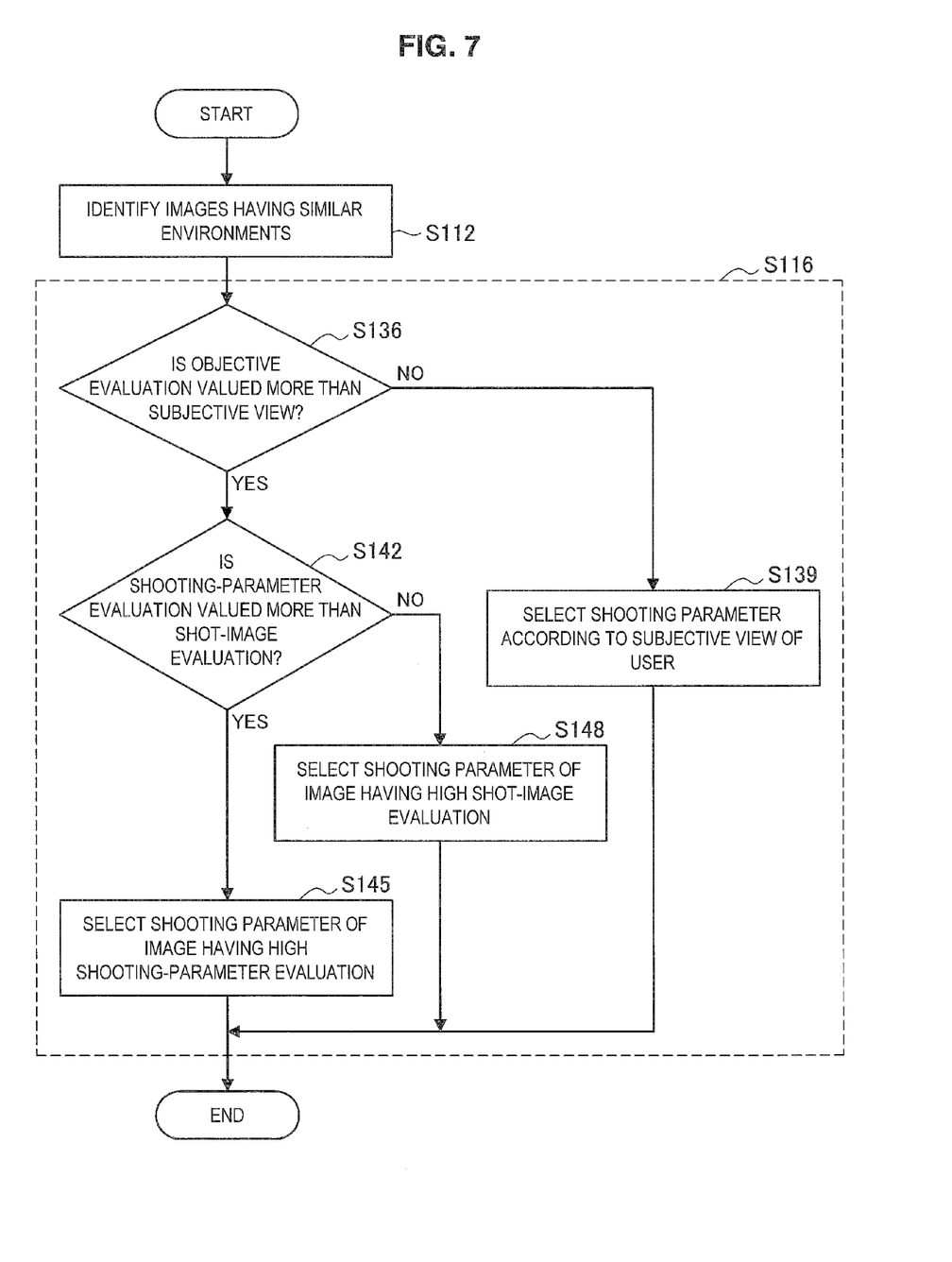
FIG. 7 is a flowchart showing decision processing of a shooting-parameter selection standard according to the present embodiment.

FIG. 7 is a flowchart showing processing of deciding a shooting-parameter selection standard according to the present embodiment. As shown in FIG. 7, in Step S112, the identification unit 33 of the server 30 first identifies images having shooting environments similar to a shooting environment of the shot image acquired from the digital camera 1 in the same way as Step S112 shown in FIG. 6.

Next, in Step S116, the selection unit 37 of the server 30 selects shooting parameters of a certain image from among the identified images. Specifically, in Step S136, the selection unit 37 determines, on the basis of the request from the digital camera, whether the objective evaluation is valued more than a subjective view. For example, when requesting to transmit the shooting parameters, the digital camera 1 may also transmit information indicating a selection standard specified by the user.

Next, in a case where it has been determined that the objective evaluation is valued more (YES in S136), the selection unit 37 determines whether the shooting-parameter evaluation is valued more than the shot-image evaluation in Step S142.

Subsequently, in a case where it has been determined that the shooting-parameter evaluation is valued more (YES in S142), the selection unit 37 selects shooting parameters of an image having highest shooting-parameter evaluation in Step S145.

On the other hand, in a case where it has been determined that the shooting-parameter evaluation is not valued more than the shot-image evaluation (NO in S142), the selection unit 37 selects shooting parameters of an image having highest shot-image evaluation in Step S148.

In Step S136, in a case where it has been determined that the objective evaluation is not valued more than the subjective view (NO in S136), the selection unit 37 may select shooting parameters according to the subjective view of the user. Specifically, for example, the images identified by the identification unit 33 are transmitted to the digital camera 1 and displayed on the display unit 16 of the digital camera 1, and then an image is selected on the basis of the subjective view of the user. Subsequently, the selection unit 37 selects shooting parameters of the image selected by the user.

[3-3. Shooting-Parameter Evaluation Processing]

Next, operation processing of the above-described shooting-parameter evaluation is explained. As describe above, the shooting-parameter evaluation is evaluation by a user who has actually shot an image by using the shooting parameters 43 assigned to the image data 41 (shot image). Accordingly, for example, after the shooting parameters are set in Step S121 in FIG. 6, evaluation of the shooting parameters can be performed by evaluating the image shot with such shooting parameters. In the following, with reference to FIG. 8, the shooting-parameter evaluation processing according to the present embodiments is explained.

Figure 8:
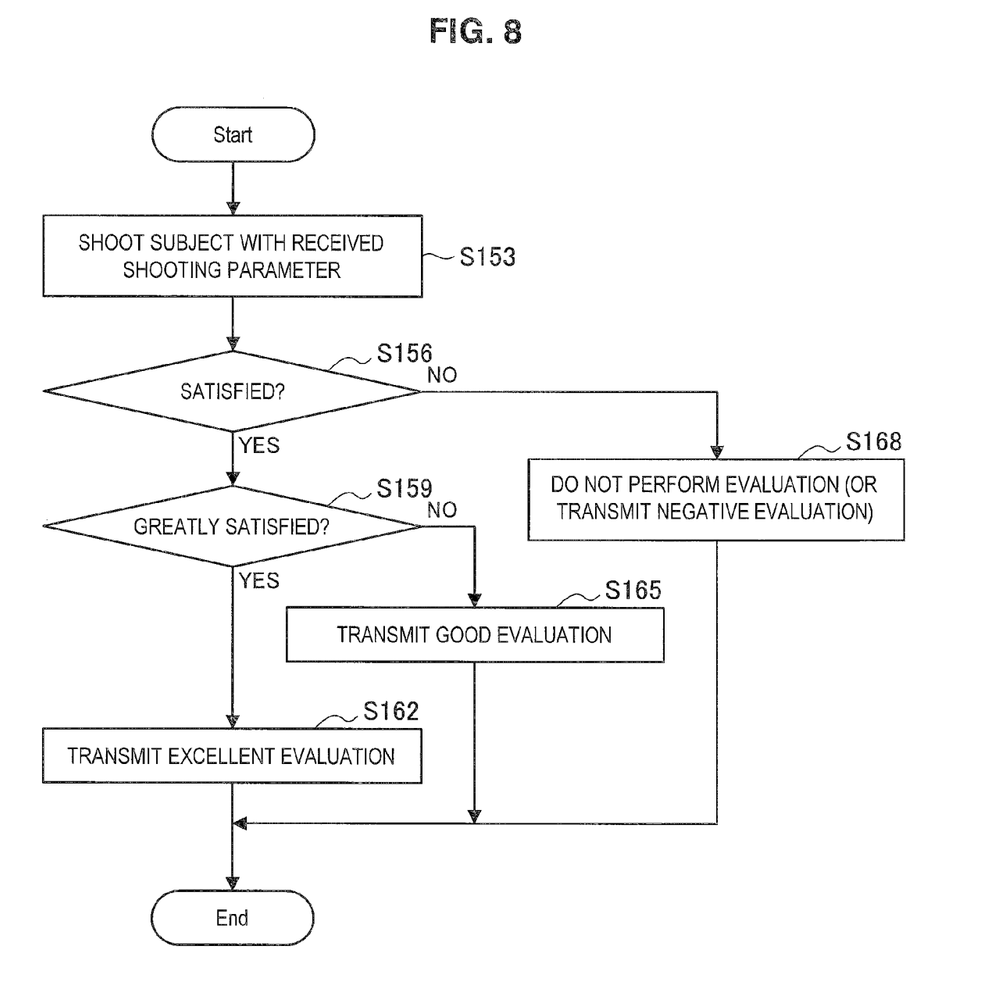
FIG. 8 is a flowchart showing operation processing of shooting-parameter evaluation according to the present embodiment.

FIG. 8 is the flowchart showing operation processing of the shooting-parameter evaluation according to the present embodiment. As shown in FIG. 8, in Step S153, the digital camera 1 first shoots a subject with shooting parameters received from the server 30. Specifically, the digital camera 1 performs control in a manner that shooting parameters of the camera module 13 are set to the received shooting parameters, and an image is shot in response to press operation of the shutter button 2 performed by the user. Next, the digital camera 1 displays the shot image on the display unit 16.

Figure 9:
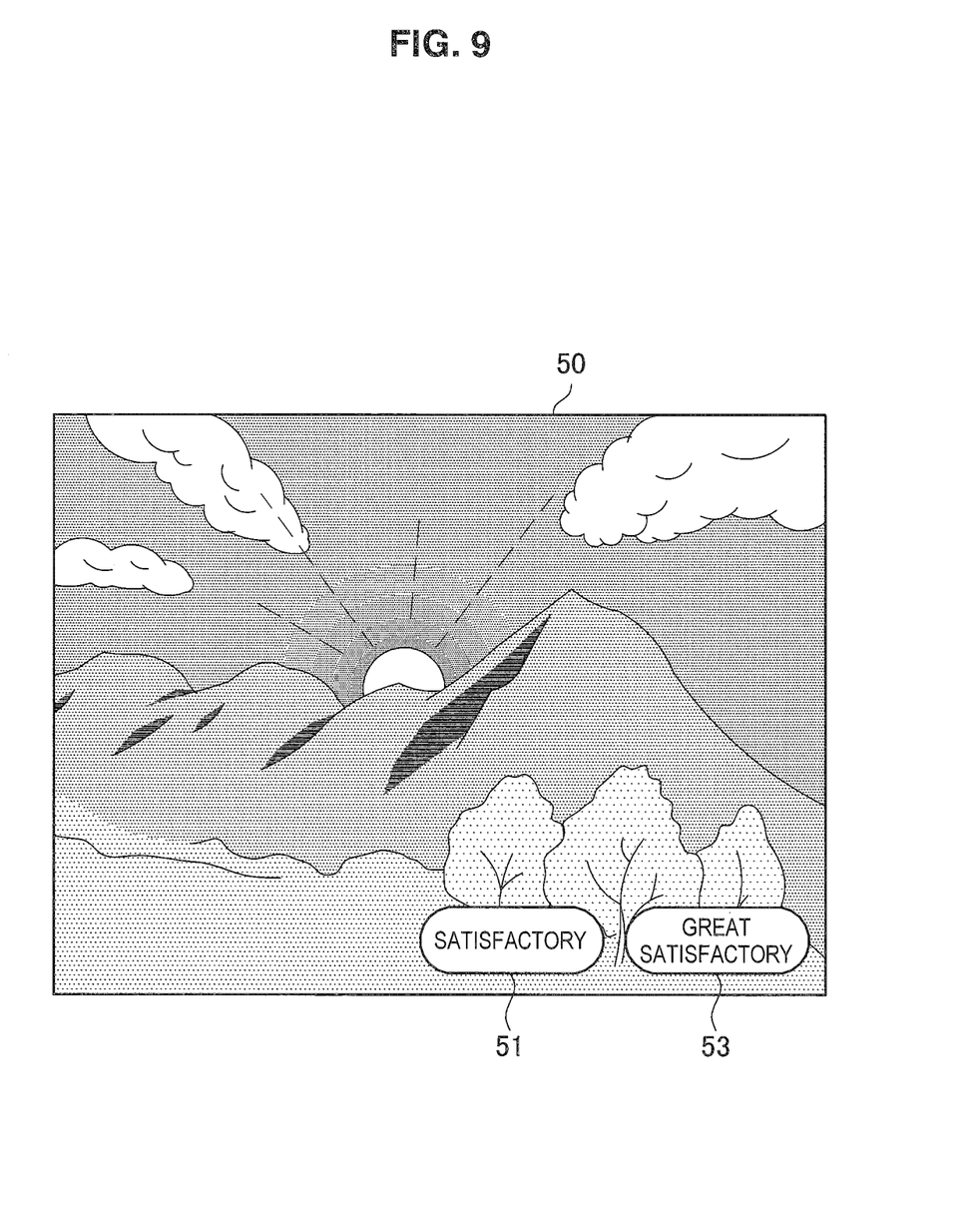
FIG. 9 is a diagram showing an example of an operation screen to which a satisfactory level of a user is input according to the present embodiment.

Subsequently, in Step S156, the digital camera 1 determines whether the user is satisfied with the shot image. Specifically, as shown in FIG. 9 for example, the digital camera 1 displays, on the display unit 16, a satisfactory button 51 and a great satisfactory button 53 together with the shot image 50. When the user selects the satisfactory button 51 or the great satisfactory button 53, it may be determined that the user is satisfied with the shot image.

Subsequently, in Step S159, the digital camera 1 determines whether the user is greatly satisfied with the shot image. For example, in a case where the user has selected the "great satisfactory button 53" shown in FIG. 9, the digital camera 1 may determine that the user is greatly satisfied with the shot image.

Next, in the case where it has been determined that the user is greatly satisfied (YES in S159), the digital camera 1 transmits excellent evaluation to the server 30 in Step S162.

On the other hand, in a case where it has been determined that the user is satisfied (YES in S156 and NO in S159), the digital camera 1 transmits good evaluation to the server 30 in Step S165.

Note that, in a case where it has been determined that the user is not satisfied (NO in S156), the digital camera 1 does not perform any evaluation or transmits negative evaluation to the server 30 in Step S168.

<4. Conclusion>

As described above, the shooting-parameters selection system according to the present disclosure can acquire most-appropriate shooting parameters that are according to the objective evaluation and that are more suitable for a situation.

More specifically, for example, the server 30 according to an embodiment of the present disclosure provides shooting parameters of an image that has a shooting environment similar to a shooting environment of an image shot by a user and that has highest objective evaluation such as shot-image evaluation or shooting-parameter evaluation. Accordingly, the digital camera 1 can acquire most-appropriate shooting parameters based on the objective evaluation.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, since some shooting parameters depend on a manufacturer and a model of the digital camera 1 (imaging device), it is desirable for the server 30 according to the present embodiment to transmit shooting parameters corresponding to the manufacturer, model, model group of the digital camera 1 which is a request source. Accordingly, the selection unit 37 of the server 30 according to the present embodiment may select an image on the basis of the objective evaluation from images shot by imaging devices that are from a same manufacturer, that are a same model, or that are in a same model group (same series) as the digital camera 1 which is the request source among images identified by the identification unit 33, and then may transmit shooting parameters of the selected image to the digital camera 1. In this way, the server 30 can transmit the shooting parameters corresponding to the manufacturer, model, or model group of the digital camera 1 which is the request source.

Additionally, the present technology may also be configured as below.

(1)
An information processing device including:
an acquisition unit configured to acquire an image from a client terminal;
a storage unit configured to store images to each of which a shooting parameter and objective evaluation are assigned;
an identification unit configured to identify images each of which has an imaging environment similar to an imaging environment of the image acquired by the acquisition unit, among the images stored in the storage unit; and
a transmission unit configured to transmit, to the client terminal, a shooting parameter of an image selected on the basis of the objective evaluation from the images identified by the identification unit.

(2)
The information processing device according to (1),
wherein the identification unit identifies the images having the similar imaging environments by comparing the acquired image and the stored images.

(3)
The information processing device according to (1) or (2),
wherein the identification unit identifies an image having the similar imaging environments on the basis of imaging position information assigned to each of the acquired image and the stored images.

(4)
The information processing device according to (3),
wherein the imaging position information is estimated from title information assigned to each of the images.

(5)
The information processing device according to any one of (1) to (4),
wherein the identification unit identifies the images having the similar imaging environments on the basis of weather information, time information, season information, date information, or illuminance information that are assigned to each of the acquired image and the stored images.

(6)
The information processing device according to any one of (1) to (5),
wherein the objective evaluation is an objective evaluation of each of the images.

(7)
The information processing device according to any one of (1) to (5),
wherein the objective evaluation is an objective evaluation of a shooting parameter of each of the images.

(8)
The information processing device according to any one of (1) to (7),
wherein the shooting parameter is at least one of shutter speed, a diaphragm, EV shift, ISO speed, an exposure mode, white balance, color emphasis, chroma, contrast, a sharpness, and ON/OFF of a flash.

(9)
The information processing device according to any one of (1) to (8),
wherein the transmission unit transmits, to the client terminal, the shooting parameter of the image selected on the basis of the objective evaluation from images captured by imaging devices that are from a same manufacturer, that are a same model, or that are in a same model group as the client terminal among the images identified by the identification unit.

(10)
A system including:
an information processing device which includes
an acquisition unit configured to acquire an image from a client terminal,
a storage unit configured to store images to each of which a shooting parameter and objective evaluation are assigned,
an identification unit configured to identify images each of which has an imaging environment similar to an imaging environment of the image acquired by the acquisition unit, among the images stored in the storage unit, and a transmission unit configured to transmit, to the client terminal, a shooting parameter of an image selected on the basis of the objective evaluation from the images identified by the identification unit; and the client terminal which includes an imaging unit configured to image a subject, a transmission unit configured to transmit, to the information processing device, an image captured by the imaging unit and a shooting parameter at a time of capturing the image, and a reception unit configured to receive the shooting parameter of the image selected by the information processing device.

(11) A non-transitory computer-readable storage medium having a program stored therein, the program causing a computer to execute:

processing of acquiring an image from a client terminal;

processing of identifying images each of which has an imaging environment similar to an imaging environment of the image acquired by the acquisition processing, among images which are stored in a storage unit and to each of which a shooting parameter and objective evaluation are assigned; and processing of transmitting, to the client terminal, a shooting parameter of an image selected on the basis of the objective evaluation from the images identified by the identification processing.

REFERENCE SIGNS LIST 1 digital camera (client terminal)
2 shutter button
4 MOVIE (moving image) button
5 playback button
6 dial
11 ROM
12 RAM
13 camera module
14 operation detection unit
15 GPS positioning unit
16 display unit
17 network I/F
18 storage medium
19 clock unit
30 server (information processing device)
31 communication unit
33 identification unit
35 shot-image database
37 selection unit
40 image file
41 image data
43 shooting parameters
45 environment information
47 evaluation data
51 satisfactory button
52 great satisfactory button

The invention claimed is:

1. An information processing device comprising:
one or more processors configured to:
acquire an image from a client terminal;
store images to each of which a shooting parameter and objective evaluation are assigned;
identify images from the stored images, each of the identified images having an imaging environment similar to an imaging environment of the acquired image; and
transmit, to the client terminal, a shooting parameter of an image selected from the identified images on the basis of the objective evaluation,
wherein the objective evaluation is different from the imaging environment.

2. The information processing device according to claim 1, wherein the one or more processors are configured to identify images having the similar imaging environments by comparing the acquired image and the stored images.

3. The information processing device according to claim 1, wherein the one or more processors are configured to identify an image having the similar imaging environments on the basis of imaging position information assigned to each of the acquired image and the stored images.

4. The information processing device according to claim 3, wherein the imaging position information is estimated from title information assigned to each of the images.

5. The information processing device according to claim 1, wherein the one or more processors are configured to identify images having the similar imaging environments on the basis of at least one of weather information, time information, season information, date information, or illuminance information that are assigned to each of the acquired image and the stored images.

6. The information processing device according to claim 1, wherein the objective evaluation is an objective evaluation of each of the images.

7. The information processing device according to claim 1, wherein the objective evaluation is an objective evaluation of a shooting parameter of each of the images.

8. The information processing device according to claim 1, wherein the shooting parameter is at least one of shutter speed, a diaphragm, EV shift, ISO speed, an exposure mode, white balance, color emphasis, chroma, contrast, a sharpness, and ON/OFF of a flash.

9. The information processing device according to claim 1, wherein the one or more processors are configured to transmit, to the client terminal, the shooting parameter of the image selected from the identified images on the basis of the objective evaluation from images captured by imaging devices that are from a same manufacturer, that are a same model, or that are in a same model group as the client terminal.

10. A system comprising:
an information processing device which includes
one or more processors configured to:
acquire an image from a client terminal,
store images to each of which a shooting parameter and objective evaluation are assigned,
identify images from the stored images, each of the identified images having an imaging environment similar to an imaging environment of the acquired image, and
transmit, to the client terminal, a shooting parameter of an image selected from the identified images on the basis of the objective evaluation,
wherein the objective evaluation is different from the imaging environment; and the client terminal which includes
one or more processors configured to:
capture an image of a subject,
transmit, to the information processing device, the captured image and a shooting parameter at a time of capturing the image, and
receive the shooting parameter of the image selected by the information processing device.

11. A non-transitory computer-readable storage medium having a program stored therein, the program causing a computer to perform steps comprising:
   acquiring an image from a client terminal;
   storing images to each of which a shooting parameter and objective evaluation are assigned,
   identifying images from the stored images, each of the identified images having an imaging environment similar to an imaging environment of the acquired image; and
   transmitting, to the client terminal, a shooting parameter of an image selected from the identified images on the basis of the objective evaluation,
   wherein the objective evaluation is different from the imaging environment.

* * * * *